United States Patent
Xu et al.

(10) Patent No.: US 9,681,465 B2
(45) Date of Patent: Jun. 13, 2017

(54) METHODS AND APPARATUS FOR POWER EFFICIENT OPERATION OF LTE BASED MACHINE TYPE COMMUNICATIONS

(71) Applicant: QUALCOMM Incorporated, San Diego, CA (US)

(72) Inventors: Hao Xu, San Diego, CA (US); Tingfang Ji, San Diego, CA (US); Peter Gaal, San Diego, CA (US); Wanshi Chen, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 14/151,330

(22) Filed: Jan. 9, 2014

(65) Prior Publication Data
US 2014/0198663 A1     Jul. 17, 2014

Related U.S. Application Data

(60) Provisional application No. 61/753,839, filed on Jan. 17, 2013.

(51) Int. Cl.
*H04W 72/12*     (2009.01)
*H04W 52/38*     (2009.01)
*H04W 52/02*     (2009.01)

(52) U.S. Cl.
CPC ... *H04W 72/1242* (2013.01); *H04W 52/0216* (2013.01); *H04W 52/0258* (2013.01); *H04W 52/383* (2013.01); *Y02B 60/50* (2013.01)

(58) Field of Classification Search
None
See application file for complete search history.

(56) References Cited

U.S. PATENT DOCUMENTS 8,144,679 B2    3/2012   Cai et al.
8,169,960 B2    5/2012   Bourlas
(Continued)

OTHER PUBLICATIONS

Institute for Information Industry (III) et al., "Dynamic Separate RACH Resources for MTC", 3GPP Draft; R2-113328 Dynamic Separate RACH Resources_for MTC, 3rd Generation Partnership Project (3GPP), Mobile Competence Centre ; 650,.Route des Lucioles ; F-06921 Sophia-Antipolis Cedex ; France, vol. RAN WG2, No. Barcelona, Spain; May 9, 2011, May 3, 2011 (May 3, 2011), XP050495442.
(Continued)

*Primary Examiner* — Chirag Shah
*Assistant Examiner* — Srinivasa Reddivalam
(74) *Attorney, Agent, or Firm* — Anthony R. Morris

(57) ABSTRACT

Certain aspects of the present disclosure generally relate to wireless communications and, more particularly, to techniques for power efficient operation of LTE MTC. A method is provided wireless communications by a user equipment (UE). The method generally includes signaling information regarding traffic requirements for the UE to a base station (BS) for use in persistent scheduling (PS), receiving signaling from the BS indicating PS opportunities of traffic for the UE, powering on the radio components for the PS opportunities, and powering down radio components between PS opportunities when traffic is not expected.

20 Claims, 11 Drawing Sheets

(56) References Cited

U.S. PATENT DOCUMENTS

| | | | |
|---|---|---|---|
| 8,254,323 B2 | 8/2012 | Chun et al. | |
| 8,385,241 B2 | 2/2013 | Yu et al. | |
| 2009/0042566 A1* | 2/2009 | Brandt | 455/434 |
| 2009/0075667 A1* | 3/2009 | Bourlas | 455/452.1 |
| 2011/0310986 A1* | 12/2011 | Heo et al. | 375/259 |
| 2012/0230280 A1 | 9/2012 | Chandra et al. | |
| 2013/0046821 A1* | 2/2013 | Alanara | H04W 52/0216 709/204 |
| 2013/0051214 A1* | 2/2013 | Fong | H04W 24/10 370/216 |
| 2014/0036847 A1* | 2/2014 | Jeong | H04W 74/004 370/329 |
| 2014/0247795 A1* | 9/2014 | Kim et al. | 370/329 |
| 2014/0254521 A1* | 9/2014 | Fong | H04L 5/0053 370/329 |

OTHER PUBLICATIONS

International Search Report and Written Opinion—PCT/US2014/011017—ISA/EPO—Mar. 6, 2014.
LG Electronics Inc: "Power Saving for MTC Devices", 3GPP Draft; R2-102124 MTC Device Power Saving R2, 3rd Generation Partnership Project (3GPP), Mobile Competence Centre ; 650, Route des Lucioles ; F-06921 Sophia-Antipolis Cedex ; France, vol. RAN WG2, No. Beijing, china; Apr. 12, 2010, Apr. 5, 2010 (Apr. 5, 2010), XP050422435.
Li H., et al., "Long Cycle Persistent Scheduling for Periodic M2M Transmissions ; C80216p-110265", IEEE Draft; C80216P-11 0265, IEEE-SA, Piscataway, NJ USA, vol. 802.16p, Sep. 10, 2011 (Sep. 10, 2011), pp. 1-5, XP017780978.

\* cited by examiner

METHODS AND APPARATUS FOR POWER EFFICIENT OPERATION OF LTE BASED MACHINE TYPE COMMUNICATIONS

The present Application for Patent claims priority to U.S. Provisional Application No. 61/753,839, filed Jan. 17, 2013, which is assigned to the assignee of the present application and hereby expressly incorporated by reference herein in its entirety.

FIELD

Certain aspects of the present disclosure generally relate to wireless communications and, more particularly, to techniques for power efficient operation of long-term evolution (LTE) based machine type communications (MTC).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices comprise user equipments (UEs) and remote devices. A UE is a device that operates under direct control by humans. Some examples of UEs include cellular phones, smart phones, personal digital assistants (PDAs), wireless modems, handheld devices, tablets, laptop computers, netbooks, smartbooks, ultrabooks, etc. A remote device is a device that operates without being directly controlled by humans. Some examples of remote devices include sensors, meters, location tags, etc. A remote device may communicate with a base station, another remote device, or some other entity. Machine type communication (MTC) refers to communication involving at least one remote device on at least one end of the communication.

SUMMARY

Certain aspects of the present disclosure provide a method for wireless communications by a user equipment (UE). The method generally includes signaling information regarding traffic requirements for the UE to a base station (BS) for use in persistent scheduling (PS), receiving signaling from the BS indicating PS opportunities of traffic for the UE, powering on the radio components for the PS opportunities, and powering down radio components between PS opportunities when traffic is not expected.

Certain aspects of the present disclosure provide an apparatus for wireless communication. The apparatus generally includes at least one processor configured to signal information regarding traffic requirements for the apparatus to a BS for use in PS, receive signaling from the BS indicating PS opportunities of traffic for the apparatus, power on the radio components for the PS opportunities, and power down radio components between PS opportunities when traffic is not expected, and a memory coupled with the at least one processor.

Certain aspects of the present disclosure provide a method of wireless communications by a BS. The method generally includes receiving information regarding traffic requirements for a UE, signaling, to the UE, information regarding PS opportunities for the UE to send or receive traffic, generated based on the received information and exchanging data with the UE during at least some of the PS opportunities.

Certain aspects of the present disclosure provide an apparatus for wireless communications. The apparatus generally includes at least one processor configured to receive information regarding traffic requirements for a UE, signal, to the UE, information regarding PS opportunities for the UE to send or receive traffic, generated based on the received information, and exchange data with the UE during at least some of the PS opportunities, and a memory coupled with the at least one processor.

Certain aspects of the present disclosure provide an apparatus for wireless communications. The apparatus generally includes means for signaling information regarding traffic requirements for the apparatus to a BS for use in PS, means for receiving signaling from the BS indicating PS opportunities of traffic for the apparatus, means for powering on the radio components for the PS opportunities, and means for powering down radio components between PS opportunities when traffic is not expected.

Certain aspects of the present disclosure provide a computer program product comprising a non-transitory computer-readable medium comprising instructions. The instructions are generally executable by a computer to cause the computer to signal information regarding traffic requirements for the computer to a BS for use in PS, receive signaling from the BS indicating PS opportunities of traffic for the computer, power on radio components for the PS opportunities, and power down the radio components between PS opportunities when traffic is not expected.

Certain aspects of the present disclosure provide a method for wireless communications by a user equipment (UE). The method generally includes powering up from a powered off state and, after powering on one or more radio components, searching through a limited frequency raster set that is a subset of a full frequency raster set defined by a standard.

Certain aspects of the present disclosure provide an apparatus for wireless communication. The apparatus generally includes at least one processor configured to power up from a powered off state and, after powering on one or more radio components, search through a limited frequency raster set that is a subset of a full frequency raster set defined by a standard, and a memory coupled with the at least one processor.

Numerous other aspects are provided including methods, apparatus, systems, computer program products, and processing systems.

DETAILED DESCRIPTION

Aspects of the present disclosure provided techniques for enhancing uplink coverage.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

Figure 1:
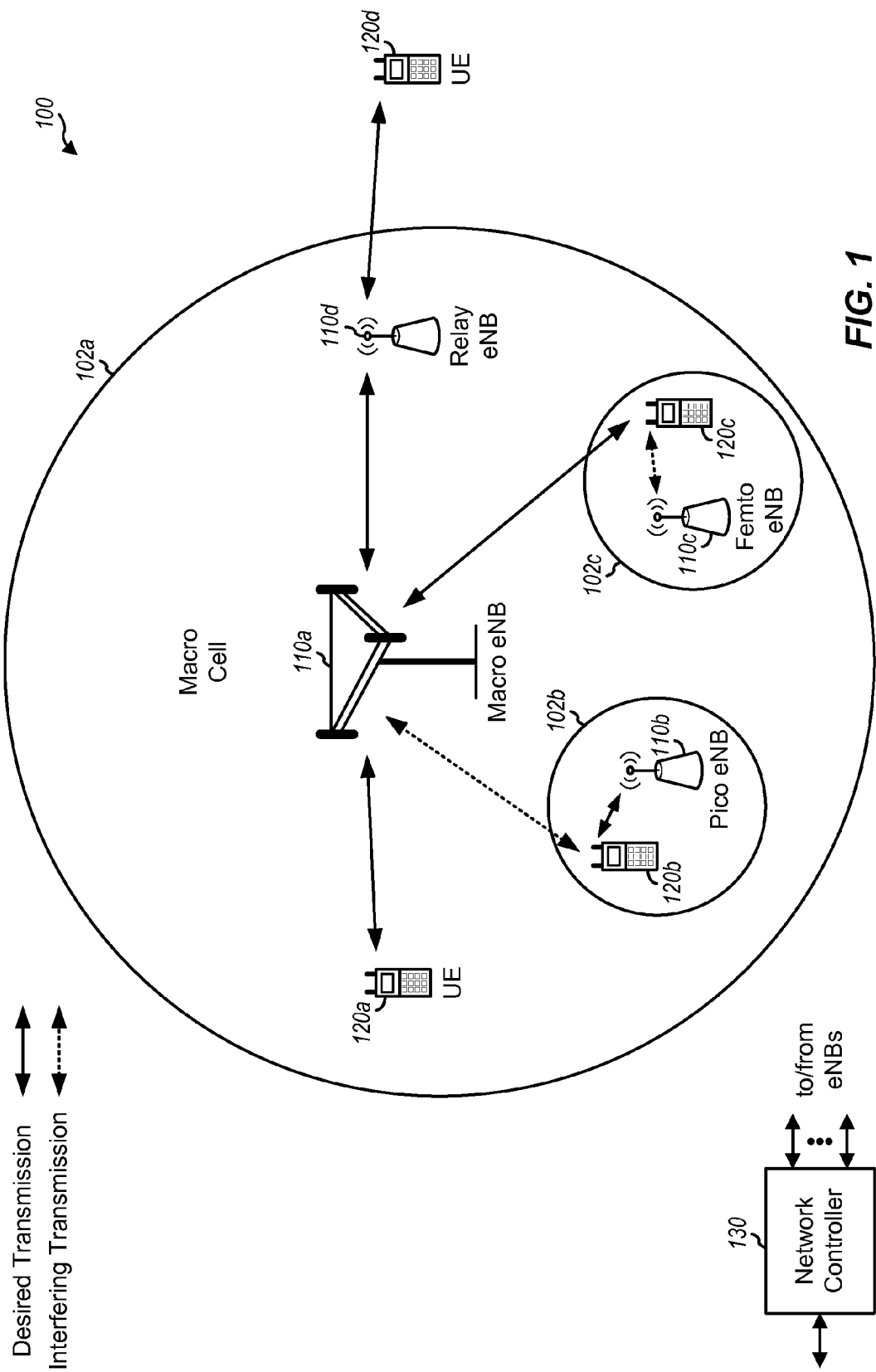
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscriptions. A pico cell may cover a relatively small geographic area and may allow unrestricted access by UEs with service subscriptions. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
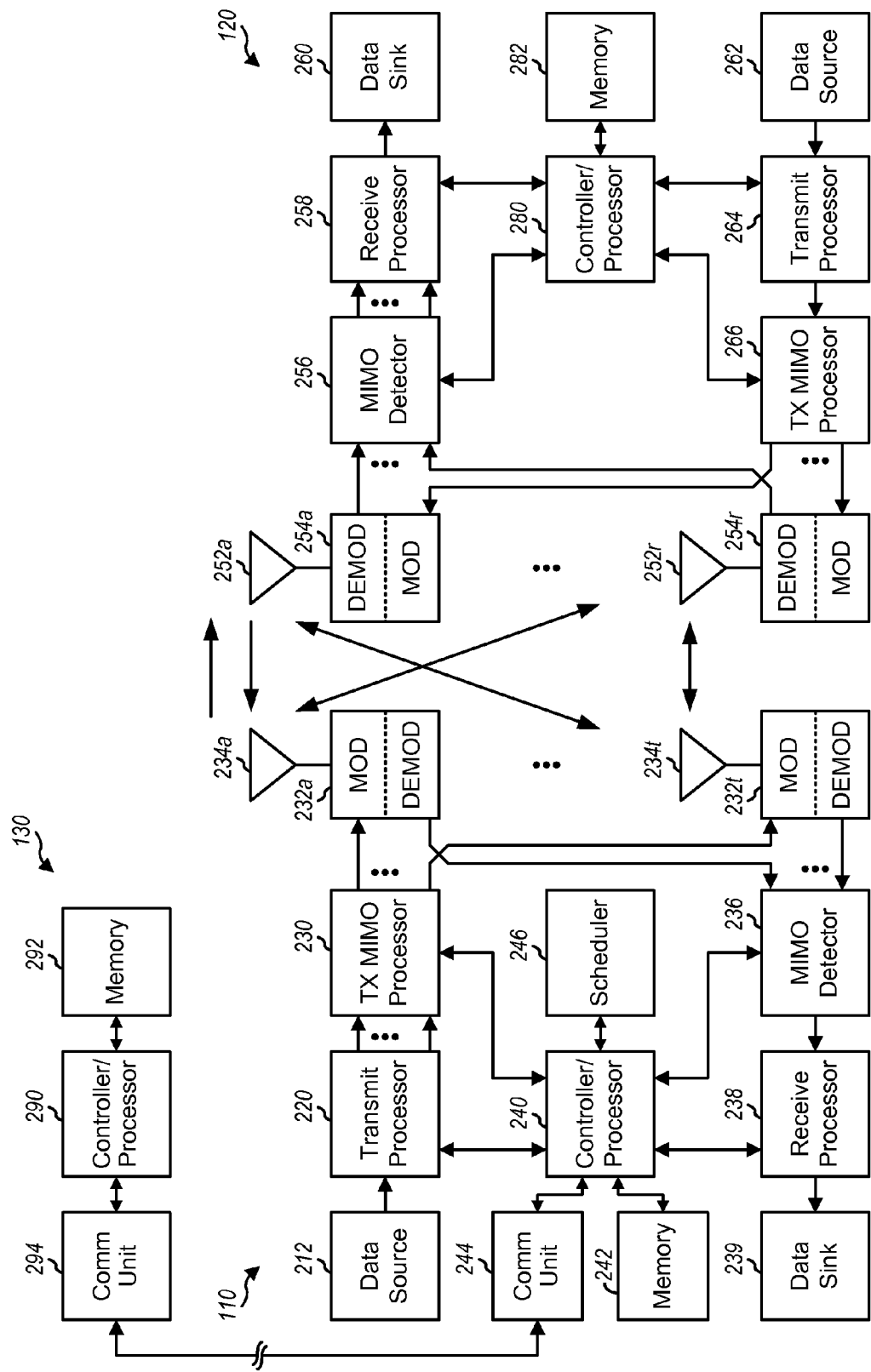
FIG. 2 shows a block diagram conceptually illustrating an example of a base station in communication with a UE in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals such as UE-RS and/or data in the resource blocks may be precoded using the same precoder. The power level used for the UE-RS in each RB (resource block) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
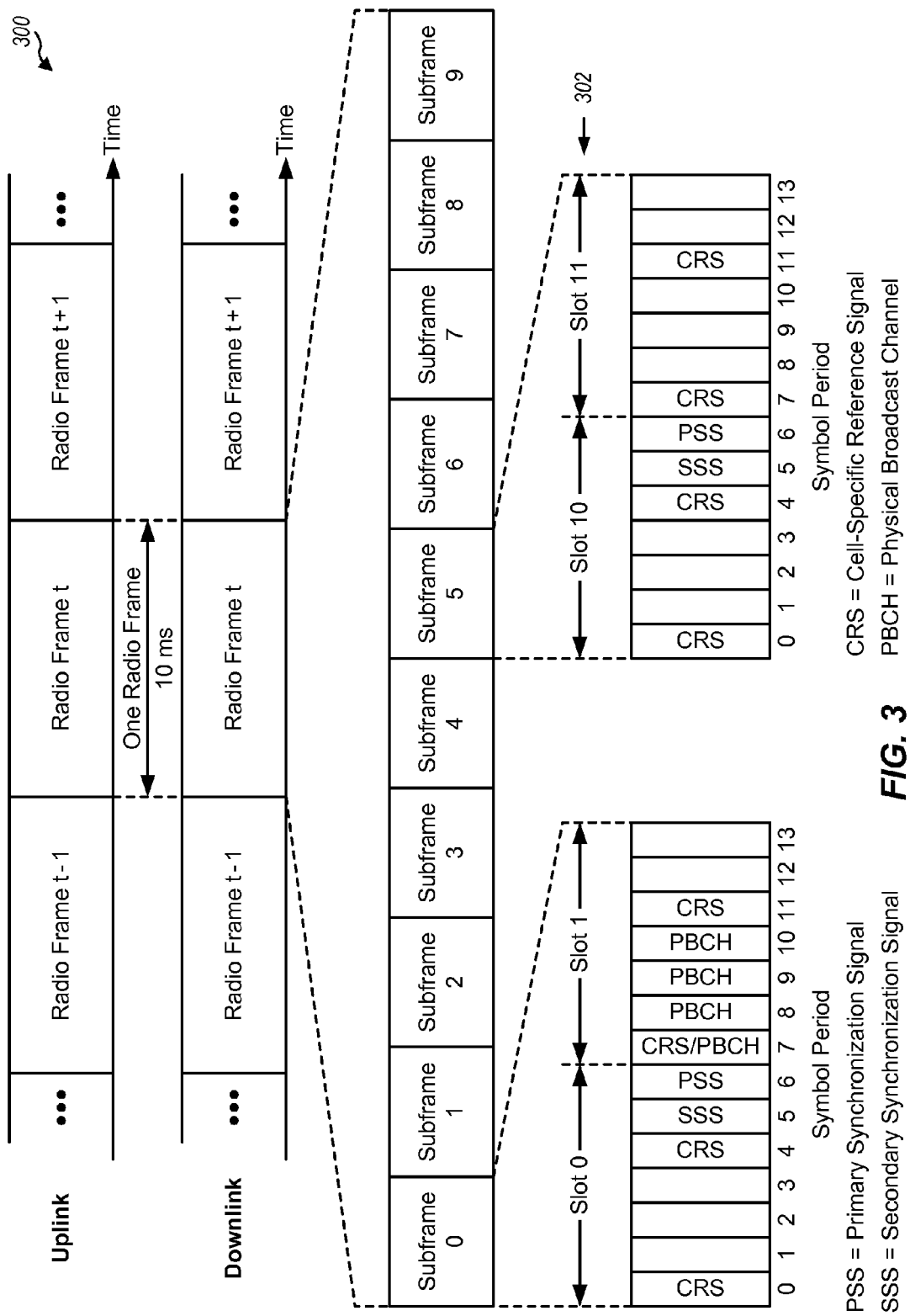
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots 302. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
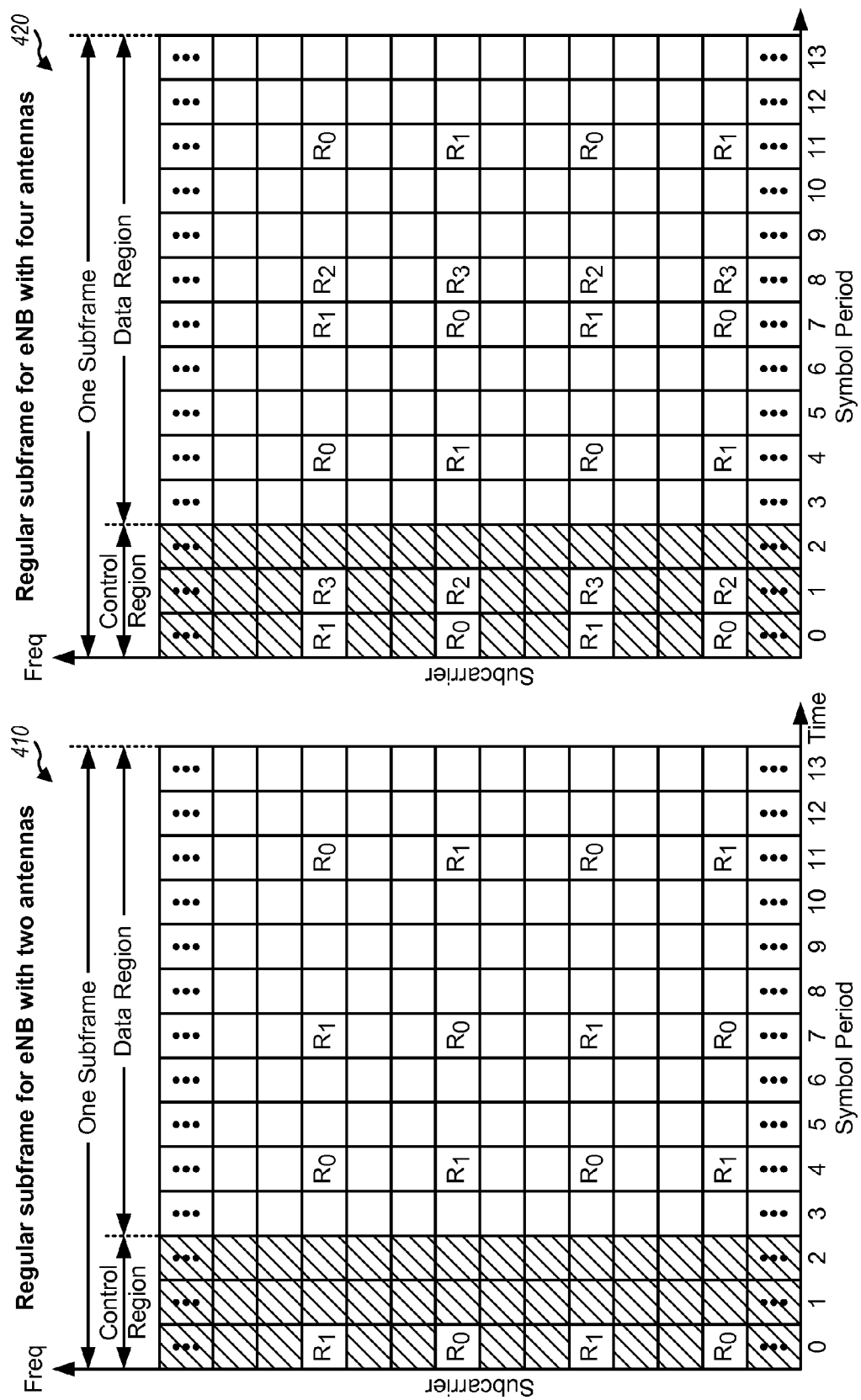
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈ {0, . . . Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

EXAMPLE POWER EFFICIENT OPERATION OF LTE MTC

LTE cellular technology may be used with MTC. The main requirements for use of LTE with MTC are low cost and low power. In some cases, though, MTC devices are located in basements or other areas with significant natural shielding. For those MTC devices, a link budget of up to 160 dB has been considered for allowing communications despite the natural shielding. Coverage enhancement techniques typically increase the power and cost, and also may have significant specification and implementation impacts. The current LTE system is optimized for high spectral efficiency.

Techniques are presented herein for modifications to LTE to save energy and improve LTE for a majority of MTC applications. Small cell deployment may be used to solve the coverage problem, and energy saving techniques using power reduction for deep sleep, active transmission/reception, and transition between sleep and active are provided.

In some embodiments, power requirements of MTC devices may be reduced by Connected Discontinuous Reception lite (CDRX_lite) and persistent scheduling of deep sleep and activity. CDRX_lite may be utilized to reduce connection setup overhead during transitions from deep sleep to activity.

Regular (i.e., personal) phones perform cell search in rasters with a step size of 100 KHz. This can lead to large power consumption. For MTC, the support of the center frequencies can be limited to be a subset of frequencies currently specified in the standard. For example, instead of a raster step size of 100 KHz, MTC devices can support a larger (e.g., 200 KHz) raster step size. This applies in the initial cell search before an MTC device establishes connection to a cell. This can also apply to the case where a UE loses connection with the serving cell and can't detect other cells at the same frequency, i.e. needs to perform search over other frequencies. This raster limitation can reduce the search time and save energy over the standard 100 KHz raster step size. In some embodiments, the initial frequency raster search when transitioning from off to activity is reduced. The activation power required may be reduced by reducing the raster search performed by the device when the device activates. Regular UEs search every 100 kHz raster when activated. For an MTC device, the raster support may be reduced to a limited number to allow for a faster search and reduced power consumption. For MTC devices, only one band may be supported for each region, or if multiple MTC bands are supported, then one carrier frequency per band can be supported.

To reduce the required raster support for the MTC devices, the requirement for raster support may be reduced in the specification document for MTC devices to a subset of the rasters defined in a specification for standard (i.e., non-MTC) devices. If the requirement for raster support is not reduced in the specification document, then MTC devices may allow manual configuration of a reduced raster value or range of raster values.

In some embodiments, Physical Uplink Control Channels (PUCCH), Physical Control Format Indicator Channels (PCFICH), and Physical HARQ Indicator Channels (PHICH) may be removed for both cost and energy saving. In CDRX_lite, all PUCCH and PCFICH/PHICH are removed for both cost and energy saving. Channel State Information (CSI) reporting may be set to slower data rates than standard LTE CSI reporting data rates, and Adaptive Modulation and Coding (AMC) may be utilized to adapt to channel conditions and may allow lower power levels in transmission.

Figure 5:
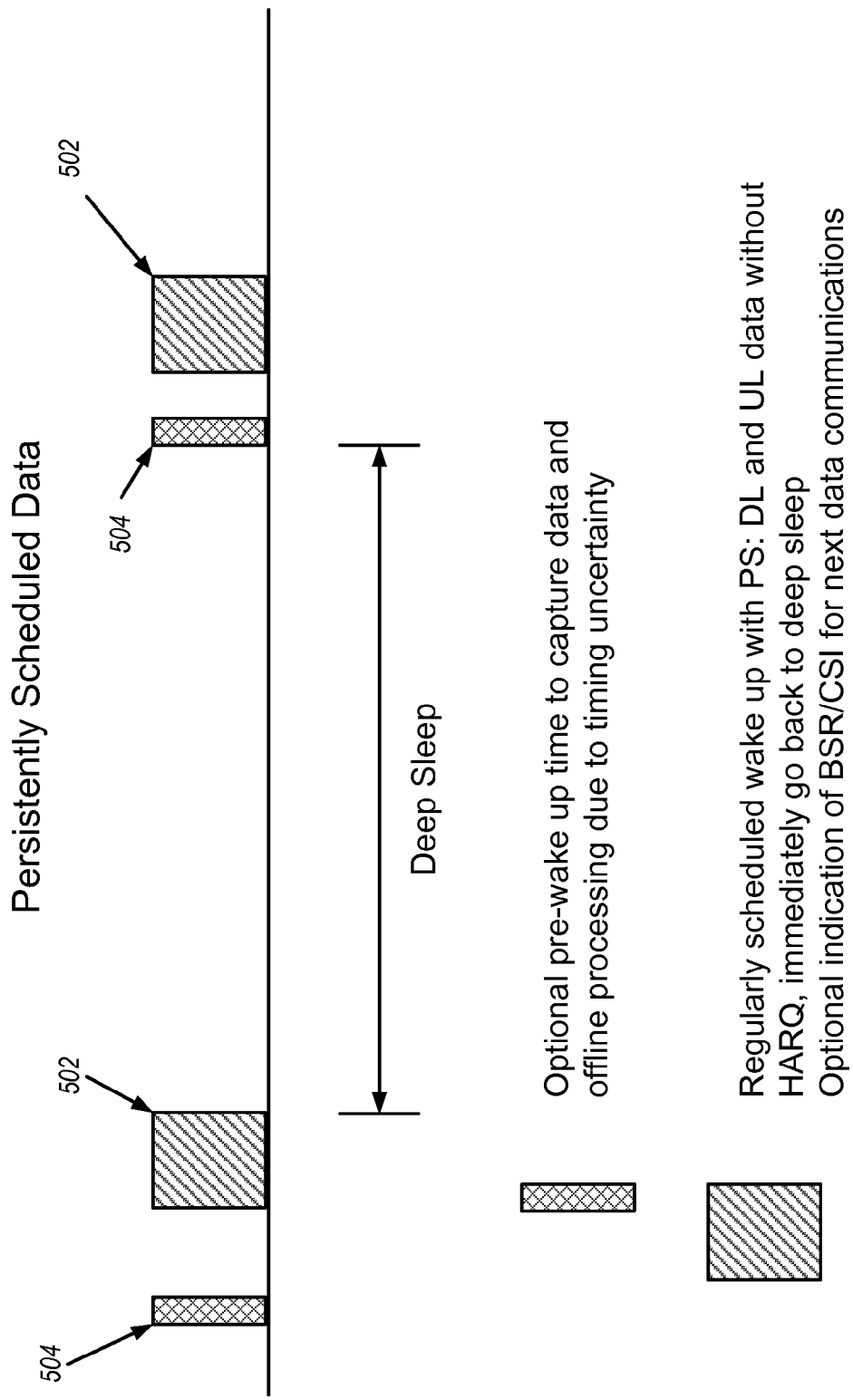
FIG. 5 illustrates an example PS channel, in accordance with certain aspects of the present disclosure.

In some embodiments, MTC devices may signal service type and traffic requirements (e.g., uplink or downlink traffic requirements) for persistently scheduled (PS) communications. FIG. 5 illustrates an example PS channel, in accordance with certain aspects of the present disclosure. As seen in FIG. 5, there may be short periods of activation 502 with long periods of deep sleep mode between them. Optional pre-wake up periods 504 are illustrated; a coarse timer's timing uncertainty may be corrected in these pre-wake up periods.

CDRX_lite with PS data reduces power consumption by performing an initial setup for traffic requirements and persistent scheduling. The device performing MTC signals a serving eNodeB (eNB) about its traffic requirement, including DownLink (DL) and UpLink (UL) traffic arrival rate, delay tolerance, traffic size, etc. By utilizing CDRX_lite for each active session with PS for regular data, active power consumption may be reduced. There may be no need to monitor UL assignment or to activate for HARQ retransmission. The device may perform direct data reception/transmission and then transitions back to deep sleep. This basic PS channel will be referred to as a fundamental PS channel.

Figure 6:
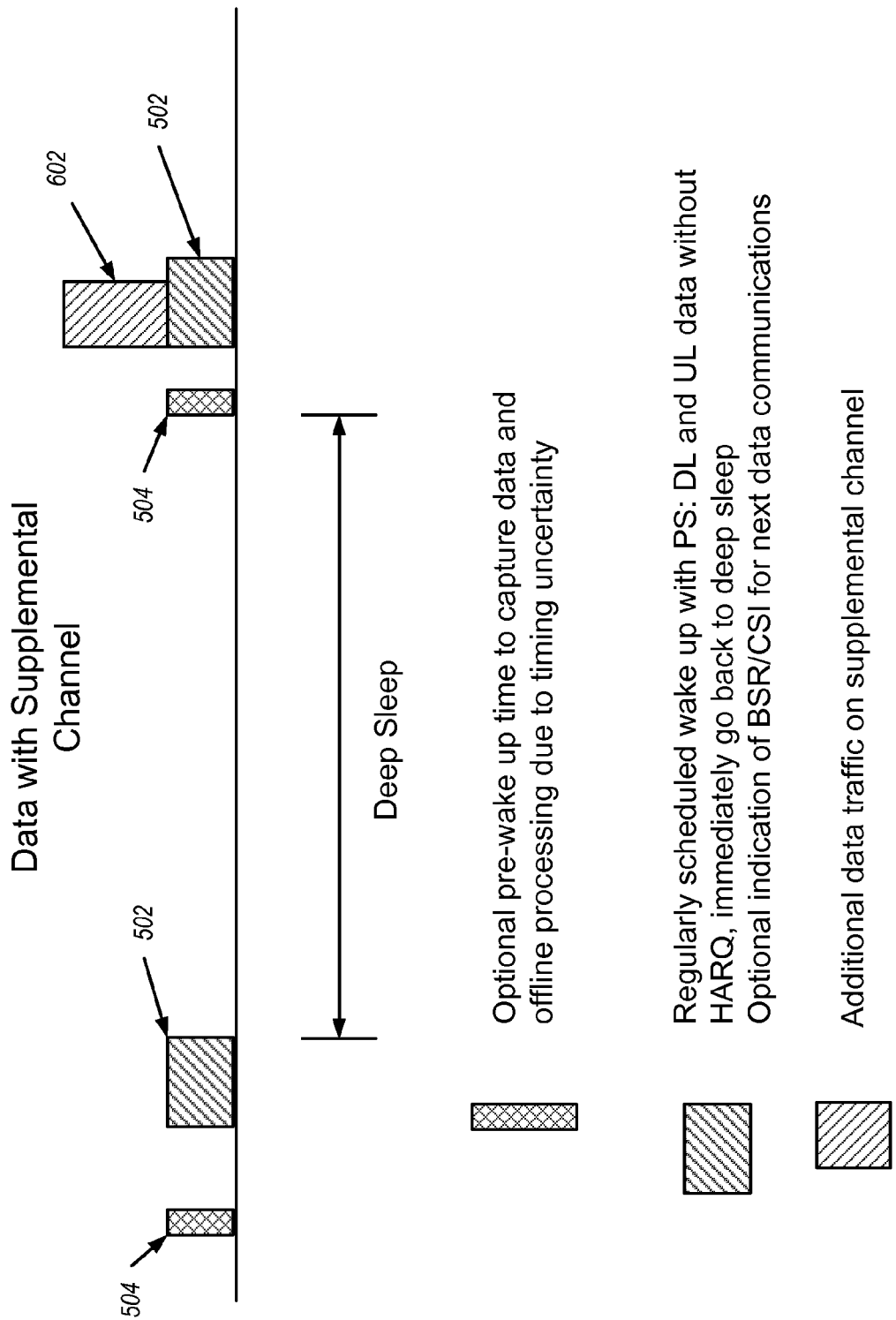
FIG. 6 illustrates an example Supplemental Persistently Scheduled (S-PS) channel, in accordance with certain aspects of the present disclosure.

In some embodiments, Supplemental Persistently Scheduled (S-PS) channel design changes are considered. FIG. 6 illustrates an example supplemental S-PS channel, in accordance with certain aspects of the present disclosure. As seen in FIG. 6, the S-PS channel is activated only when additional (e.g., supplemental) data 602 must be transmitted.

In some embodiments, persistently scheduled communications are always available for MTC traffic based on the arrival rate of regular data (e.g., data regularly transmitted to the MTC device and data regularly transmitted by the MTC device to a base station). S-PS may be configured for the MTC device during connection setup, but activated on an as-needed basis upon arrival of delay-tolerant, supplemental DL/UL data.

In some embodiments, signaling for the supplemental channel may be performed by transmitting PDCCH/EPDCCH information in the same subframe as fundamental PS channels or on paging occasions. The signaling for activating the supplemental channel may comprise one or more bits of a data channel transmitted in a PS opportunity. Alternatively, the supplemental channel may be signaled by including the information (i.e., activate the channel) in a fundamental channel, e.g. information in a Medium Access Control (MAC) header could be used to set up the supplemental channel when needed.

In some embodiments, power requirements are reduced by operating without Hybrid Automatic Retransmission requests (HARQ). Transmissions are performed without HARQ to reduce active transmission/reception time, therefore reducing the power required. In some embodiments, Chase combining is used where HARQ is removed.

In some embodiments, deep sleep periods during which the receiver is turned off are provided. Based on the duty cycle of the MTC traffic, the MTC device may be in deep sleep mode for the majority of the time. The MTC device may completely shut off the modem during the deep sleep period to reduce the power required. A coarse clock runs to maintain timing for the next activation period. No measurements are taken and no reporting occurs during a deep sleep period. Also, no paging monitoring is performed during a deep sleep period. Long sleep cycles, e.g. minutes or hours, may be implemented in MTC devices.

In some embodiments, urgent data may be handled by Random Access Channel (RACH)/Paging between scheduled operations. CDRX_lite+RACH/paging may be utilized to allow persistent scheduling for regular data transmission, while urgent irregular data arrival relies on RACH/paging, and delay-tolerant irregular or supplemental data may optionally be transmitted on a supplemental channel.

Persistently scheduled transmissions are always available for MTC traffic based on the arrival rate and minimum data rate. Urgent additional traffic can be transmitted using RACH or paging in the following manner. For urgent DL data, the MTC device may monitor the paging channel to determine (i.e., by detecting a page directed to the MTC device) if there is any DL data to receive. When a cellular base unit has additional or urgent data to send to the MTC device, the base unit may transmit a page addressed to the MTC device on the paging channel. When the MTC device detects a page addressed to itself, the MTC device may activate or maintain activation of the modem, transmitter, or receiver to receive the additional or urgent data. Scheduling information may be transmitted on the predefined supplemental channel or on the Physical Downlink Control Channel (PDCCH) or evolved Physical Downlink Control Channel (EPDCCH) grant.

Figure 7:
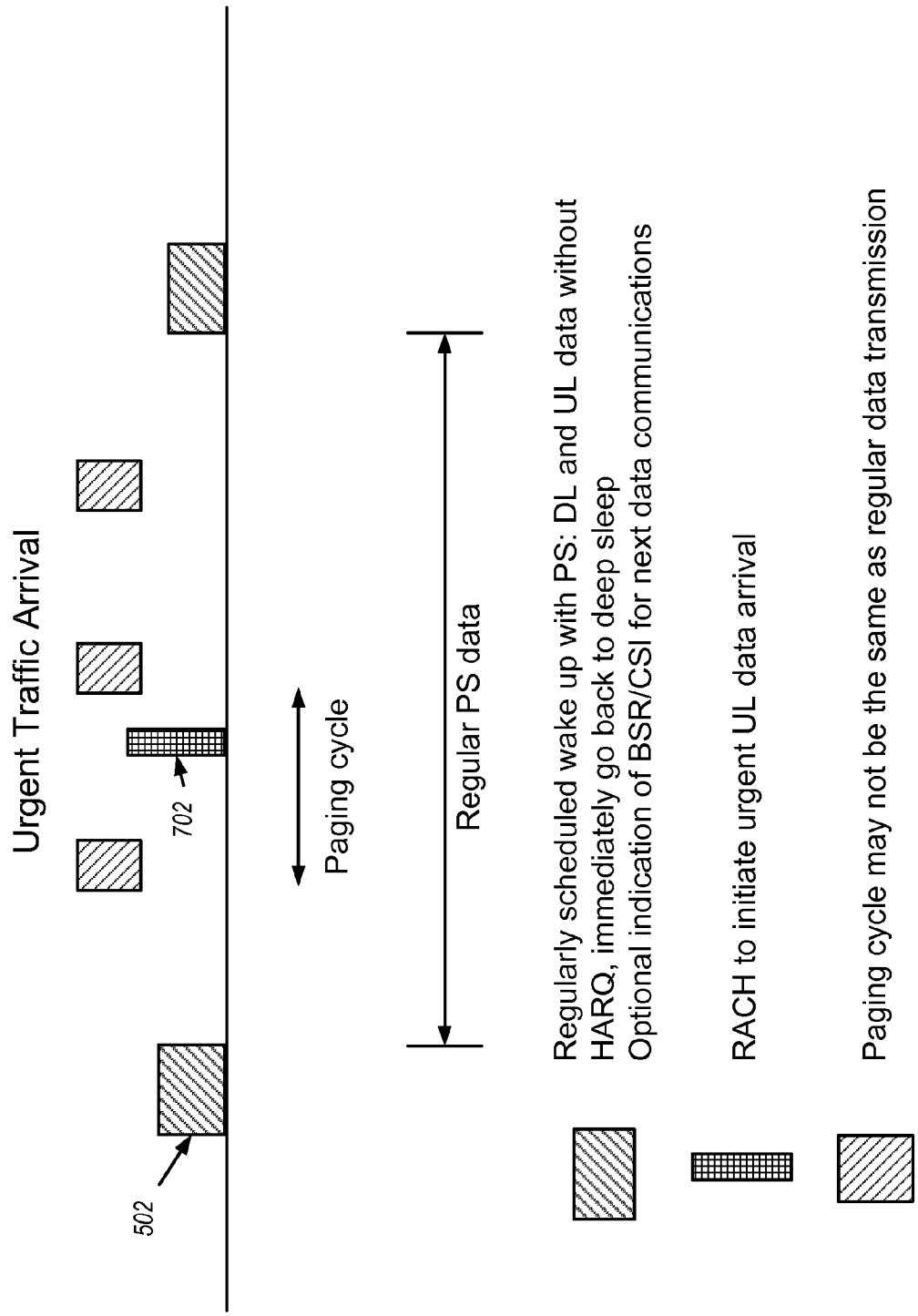
FIG. 7 illustrates the handling of urgent traffic using RACH/Paging, in accordance with certain aspects of the present disclosure.

FIG. 7 illustrates the handling of urgent traffic using RACH/Paging, in accordance with certain aspects of the present disclosure. As seen in FIG. 7, the cellular base unit maintains a paging cycle for urgent DL traffic, and the MTC device utilizes RACH 702 to transmit urgent UL traffic. For urgent UL data, the MTC device may send a RACH signal to trigger a connection from the base unit. When triggering a connection from the base unit for urgent UL data, the MTC device may reveal its unique identity in the RACH procedure to connect to the network if the Radio Network Temporary Identifier (RNTI) for the MTC device is reused outside of the PS fundamental channel time. A second option is to configure the MTC to reveal only its RNTI, and the network can treat this as a transmission independent from the fundamental channel.

Figure 8:
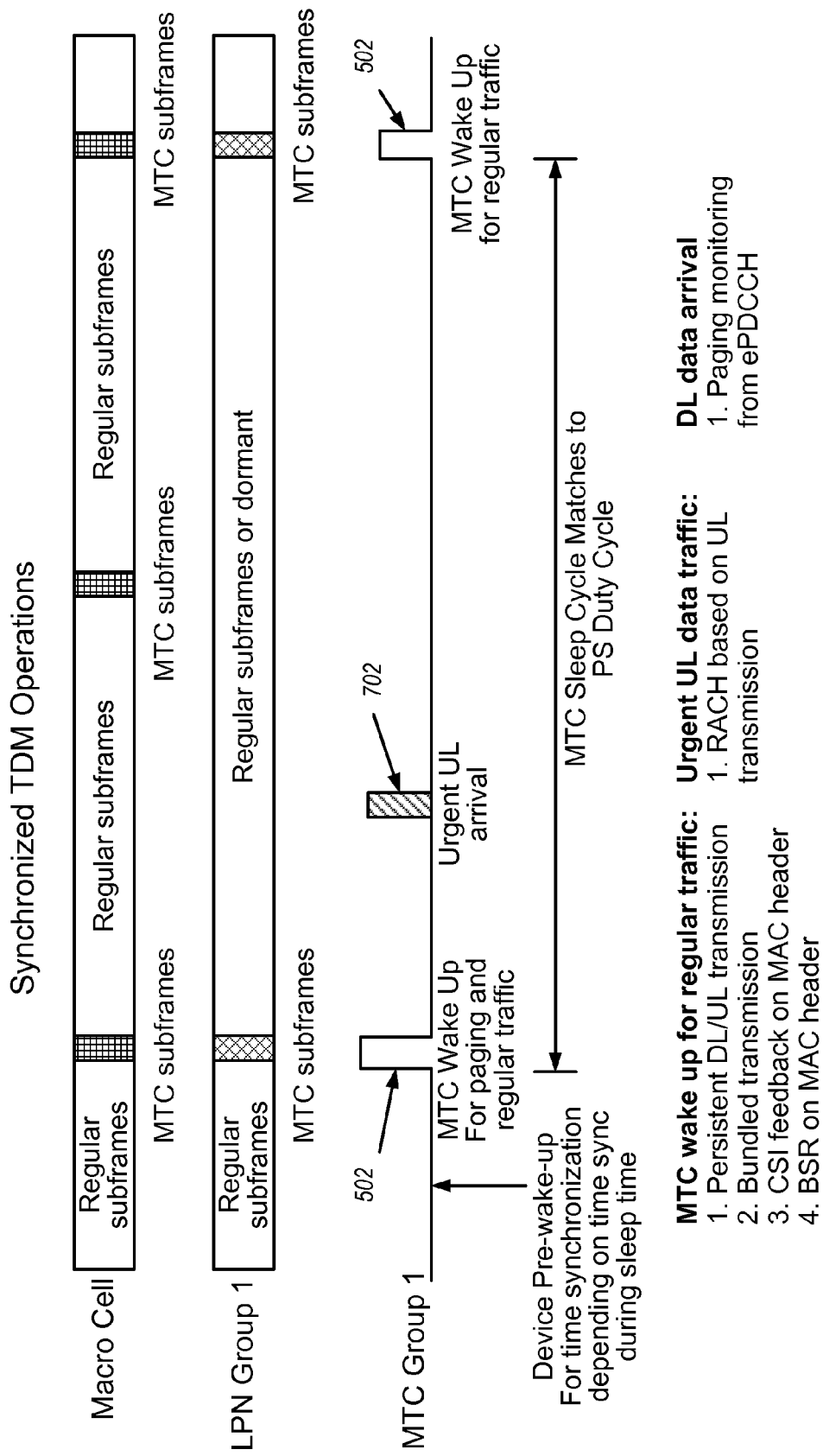
FIG. 8 illustrates the operation of an MTC device in a cellular network, showing how the MTC device is active for only short periods of time, synchronized with the subframes assigned to it by the local cell, in accordance with certain aspects of the present disclosure.

FIG. 8 illustrates the operation of an MTC device in a cellular network, in accordance with certain aspects of the present invention. As seen in FIG. 8, the MTC device is active for only short periods of time 502, synchronized with the subframes assigned to it by the local cell. FIG. 8 also illustrates examples of handling for both regular and urgent data 702.

In some embodiments, because of reduced receiving antennas in some MTC devices, frequency hopping may be used within a subframe to increase the transmit diversity order. Frequency may be hopped within a subframe and across subframe boundaries.

Figure 9:
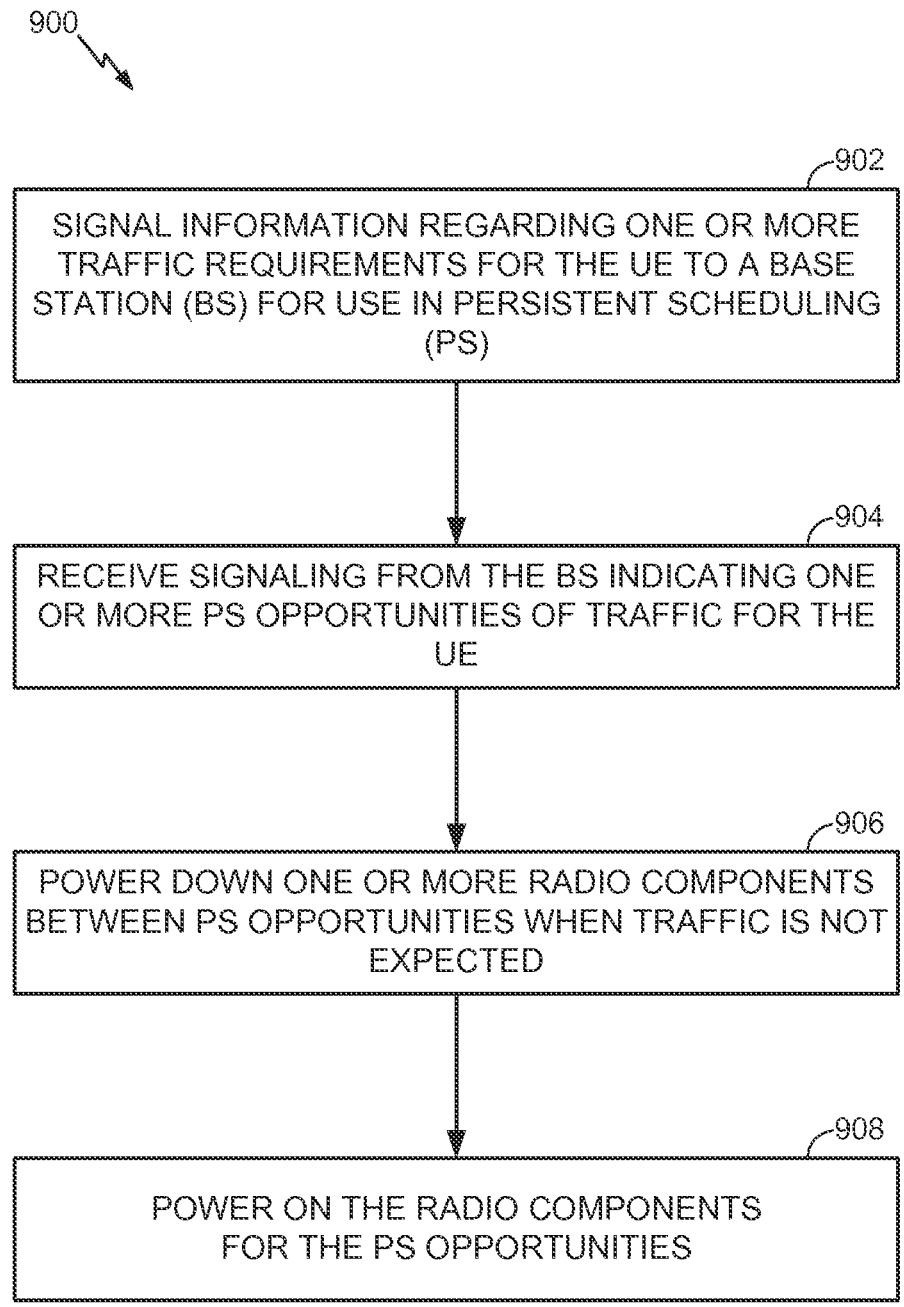
FIG. 9 illustrates example operations for wireless communications by a UE, in accordance with certain aspects of the present disclosure.

FIG. 9 illustrates example operations 900 for wireless communications by a user equipment (UE), in accordance with certain aspects of the present disclosure. The operations 900 may begin at 902 by signaling information regarding one or more traffic requirements for the UE to a base station (BS) for use in persistent scheduling (PS). At 904, the UE may receive signaling from the BS indicating one or more PS opportunities of traffic for the UE. At 906, the UE may power down one or more radio components between PS opportunities when traffic is not expected. And at 908, the UE may power on the radio components for the PS opportunities.

Figure 10:
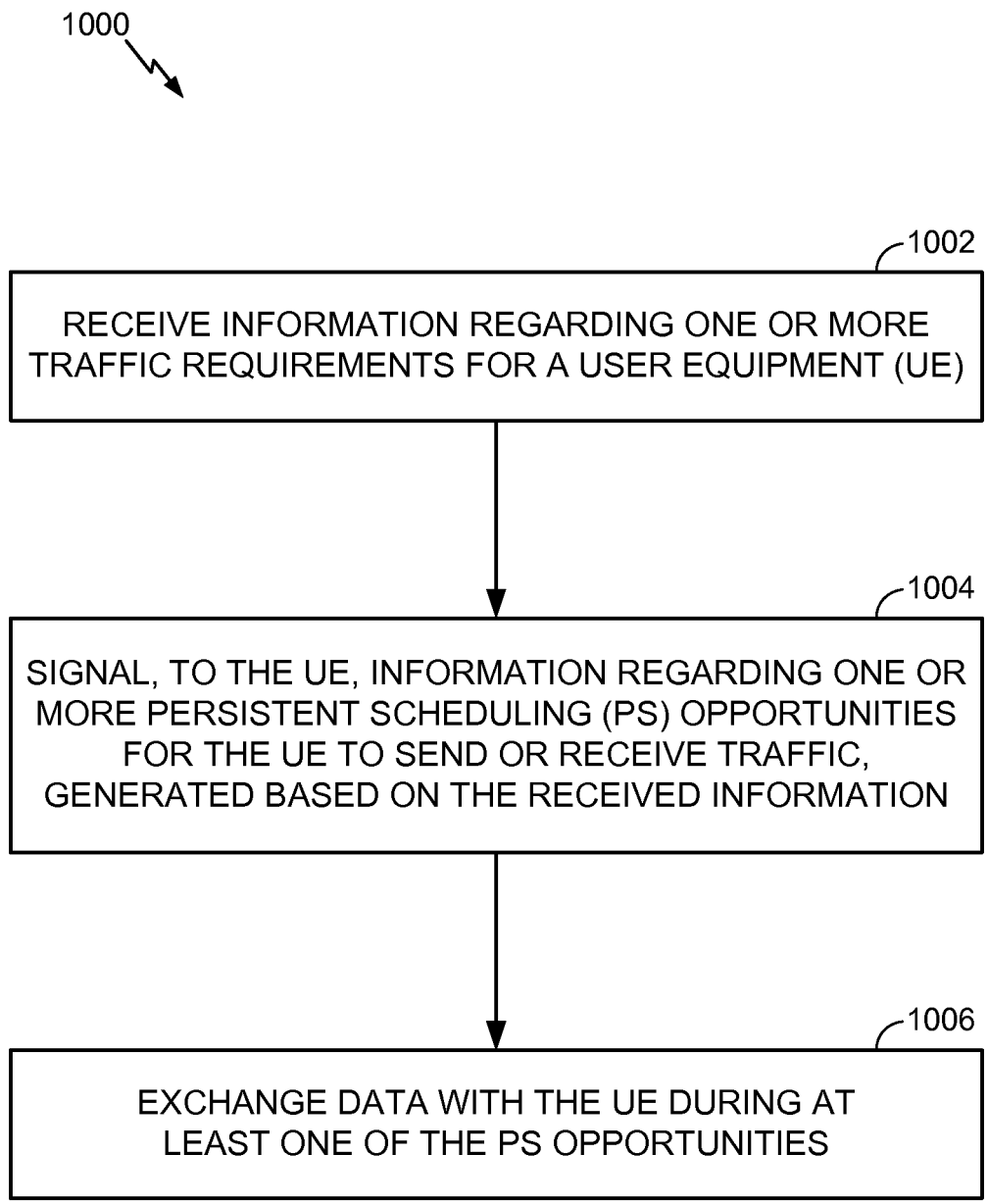
FIG. 10 illustrates example operations for wireless communications by a BS, in accordance with certain aspects of the present disclosure.

FIG. 10 illustrates example operations 1000 for wireless communications by a base station (BS), in accordance with certain aspects of the present disclosure. The operations 1000 may begin at 1002 by receiving information regarding one or more traffic requirements for a user equipment (UE). At 1004, the base station may signal, to the UE, information regarding one or more persistent scheduling (PS) opportunities for the UE to send or receive traffic, generated based on the received information. And at 1006, the base station may exchange data with the UE during at least one of the PS opportunities.

Figure 11:
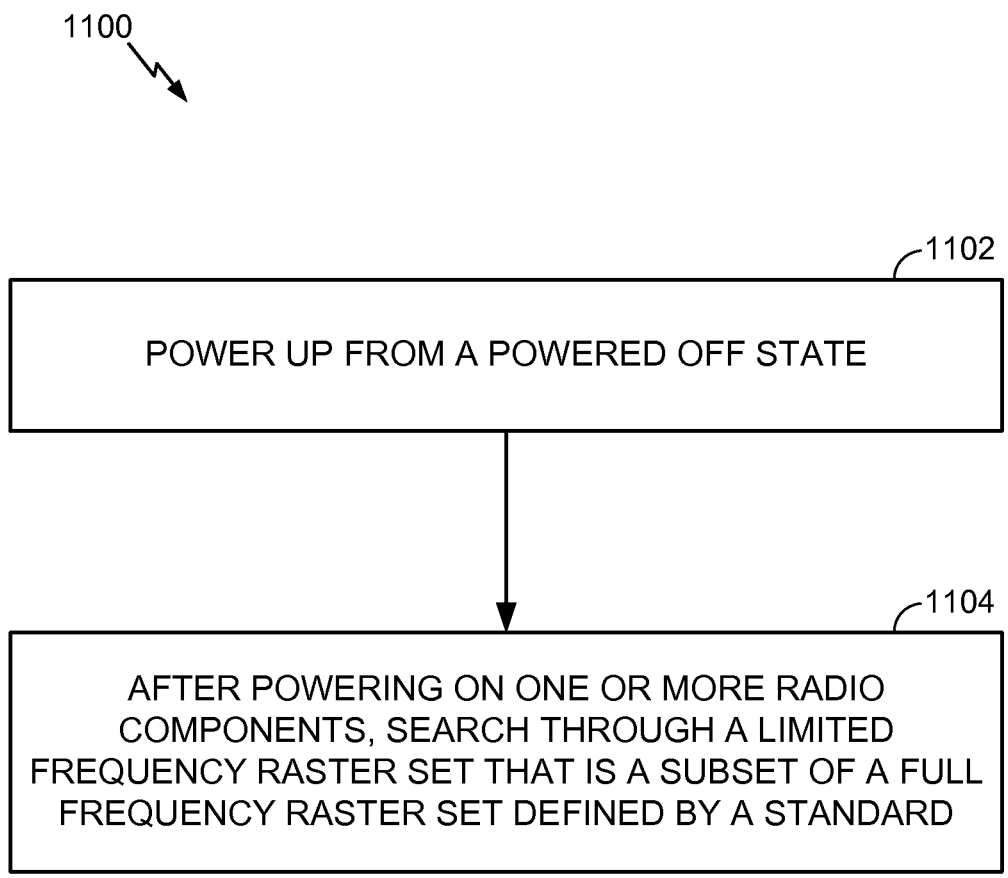
FIG. 11 illustrates example operations for wireless communications by a UE, in accordance with certain aspects of the present disclosure.

FIG. 11 illustrates example operations 1100 for wireless communications by a user equipment (UE), in accordance with certain aspects of the present disclosure. The operations 1100 may begin at 1102 by the UE powering up from a powered off state. At 1104, the UE may, after powering on one or more radio components, search through a limited frequency raster set that is a subset of a full frequency raster set defined by a standard.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software/firmware, or combinations thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communications by a user equipment (UE), comprising:
   signaling information regarding one or more traffic requirements for the UE to a base station (BS) for use in persistent scheduling (PS);
   receiving signaling from the BS indicating one or more PS opportunities of traffic for the UE;
   powering down one or more radio components between PS opportunities when traffic is not expected;
   powering on the radio components for the PS opportunities;
   receiving an indication, of downlink traffic, from the BS in a same subframe as one of the PS opportunities;
   detecting uplink traffic, comprising uplink data, for the UE to send or receive before a next PS opportunity;
   powering on or maintaining power for the radio components for at least one of the uplink traffic or the downlink traffic for the UE to send or receive before the next PS opportunity;
   performing a random access channel (RACH) procedure to signal the uplink data to the BS; and
   revealing a unique identity of the UE via the RACH procedure.

2. The method of claim 1, wherein the information comprises at least one of expected downlink and uplink traffic arrival rate, delay tolerance, or traffic size.

3. The method of claim 1, further comprising, while the radio components are powered down between PS opportunities, refraining from performing one or more of:
   monitoring for uplink (UL) assignments;
   waking up for a hybrid automatic retransmission request (HARQ) retransmission; and
   monitoring a physical HARQ indicator channel (PHICH).

4. The method of claim 1, wherein the indication of the downlink traffic is received in at least one of: a downlink physical control channel or one or more bits of a data channel received in the PS opportunity.

5. The method of claim 1, wherein the receiving comprises detecting a page indicating downlink data for the UE.

6. The method of claim 5, wherein scheduling information for the downlink data is provided in at least one of a physical downlink control channel (PDCCH) or an enhanced PDCCH (ePDCCH).

7. The method of claim 1, further comprising:
   after powering on the radio components, searching through a limited frequency raster set that is a subset of a full frequency raster set defined by a standard.

8. The method of claim 1, further comprising:
   detecting other traffic for the UE to send or receive on resources that are not persistently scheduled during the next PS opportunity; and
   powering on or maintaining power for the radio components for the other traffic for the UE to send or receive on resources that are not persistently scheduled during the next PS opportunity.

9. The method of claim 8, wherein the other traffic for the UE to send or receive on resources that are not persistently scheduled during the next PS opportunity comprises uplink data and the method further comprises:
   performing another random access channel (RACH) procedure to signal the uplink data to the BS; and
   revealing a radio network temporary identifier (RNTI) of the UE in the other RACH procedure.

10. An apparatus for wireless communications, comprising:
    at least one processor configured to:
       signal information regarding one or more traffic requirements for the apparatus to a base station (BS) for use in persistent scheduling (PS);
       receive signaling from the BS indicating one or more PS opportunities of traffic for the apparatus;
       power down one or more radio components between PS opportunities when traffic is not expected;
       power on the radio components for the PS opportunities;
       receive an indication of downlink traffic, from the BS in a same subframe as one of the PS opportunities;
       detect uplink traffic, comprising uplink data, for the apparatus to send or receive before a next PS opportunity;
       power on or maintain power for the radio components for at least one of the uplink traffic or the downlink traffic for the apparatus to send or receive before the next PS opportunity;
       perform a random access channel (RACH) procedure to signal the uplink data to the BS; and
       reveal a unique identity of the apparatus via the RACH procedure; and
    a memory coupled with the at least one processor.

11. The apparatus of claim 10, wherein the information regarding traffic requirements comprises at least one of expected downlink and uplink traffic arrival rate, delay tolerance, or traffic size.

12. The apparatus of claim 11, wherein, while the radio components are powered down between PS opportunities, the apparatus refrains from one or more of:
    monitoring for uplink (UL) assignments;
    waking up for a hybrid automatic retransmission request (HARQ) retransmission; and
    monitoring a physical HARQ indicator channel (PHICH).

13. The apparatus of claim 10, wherein the indication of the downlink traffic is received in at least one of: a downlink physical control channel or one or more bits of a data channel received in the PS opportunity.

14. The apparatus of claim 10, wherein the receiving comprises detecting a page indicating downlink data for the apparatus.

15. The apparatus of claim 14, wherein scheduling information for the downlink data is provided in at least one of a physical downlink control channel (PDCCH) or an enhanced PDCCH (ePDCCH).

16. The apparatus of claim 10, wherein the at least one processor is further configured to:
    search through a limited frequency raster set that is a subset of a full frequency raster set defined by a standard, after powering on the radio components.

17. The apparatus of claim 10, wherein the at least one processor is further configured to:
    detect other traffic for the apparatus to send or receive on resources that are not persistently scheduled during the next PS opportunity; and
    power on or maintain power for the radio components for the other traffic for the apparatus to send or receive on resources that are not persistently scheduled during the next PS opportunity.

18. The apparatus of claim 17, wherein:
    the other traffic for the apparatus to send or receive on resources that are not persistently scheduled during the next PS opportunity comprises uplink data;
    the at least one processor is further configured to:
       perform another random access channel (RACH) procedure to signal the uplink data to the BS; and
       reveal a radio network temporary identifier (RNTI) of the apparatus in the other RACH procedure.

19. An apparatus for wireless communications, comprising:
    means for signaling information regarding one or more traffic requirements for the apparatus to a base station (BS) for use in persistent scheduling (PS);

means for receiving signaling from the BS indicating one or more PS opportunities of traffic for the apparatus;
means for powering down radio components between PS opportunities when traffic is not expected;
means for powering on the radio components for the PS opportunities;
means for receiving an indication, of downlink traffic, from the BS in a same subframe as one of the PS opportunities;
means for detecting uplink traffic, comprising uplink data, for the apparatus to send or receive before a next PS opportunity;
means for powering on or maintaining power for the radio components for at least one of the uplink traffic or the downlink traffic for the apparatus to send or receive before the next PS opportunity;
means for performing a random access channel (RACH) procedure to signal the uplink data to the BS; and
means for revealing a unique identity of the apparatus via the RACH procedure.

20. A non-transitory computer-readable medium comprising instructions executable to:

signal information regarding one or more traffic requirements for a user equipment (UE) to a base station (BS) for use in persistent scheduling (PS);
receive signaling from the BS indicating one or more PS opportunities of traffic for the UE;
power down radio components of a UE between PS opportunities when traffic is not expected;
power on the radio components for the PS opportunities;
receive an indication, of downlink traffic, from the BS in a same subframe as one of the PS opportunities;
detect uplink traffic, comprising uplink data, for the apparatus to send or receive before a next PS opportunity;
power on or maintain power for the radio components for at least one of the uplink traffic or the downlink traffic for the UE to send or receive before the next PS opportunity;
perform a random access channel (RACH) procedure to signal the uplink data to the BS; and
reveal a unique identity of the UE via the RACH procedure.

* * * * *